(12) United States Patent
Kim et al.

(10) Patent No.: US 10,354,115 B2
(45) Date of Patent: Jul. 16, 2019

(54) CAPACITIVE FINGERPRINT SENSOR

(71) Applicant: SILICON DISPLAY TECHNOLOGY, Yongin-si (KR)

(72) Inventors: Ki Joong Kim, Suwon-si (KR); Jin Hyeong Yoo, Dangjin-si (KR); Bong Yeob Hong, Suwon-si (KR); Yong Kuk Kim, Yongin-si (KR); Ji Ho Hur, Yongin-si (KR)

(73) Assignee: SILICON DISPLAY TECHNOLOGY, Yongin-si (KR)

( * ) Notice: Subject to any disclaimer, the term of this patent is extended or adjusted under 35 U.S.C. 154(b) by 131 days.

(21) Appl. No.: 15/560,191

(22) PCT Filed: Apr. 7, 2016

(86) PCT No.: PCT/KR2016/003650
§ 371 (c)(1),
(2) Date: Sep. 21, 2017

(87) PCT Pub. No.: WO2016/163775
PCT Pub. Date: Oct. 13, 2016

(65) Prior Publication Data
US 2018/0089486 A1    Mar. 29, 2018

(30) Foreign Application Priority Data

Apr. 8, 2015  (KR) .................. 10-2015-0049655

(51) Int. Cl.
*G06K 9/00*    (2006.01)
(52) U.S. Cl.
CPC ......... *G06K 9/0002* (2013.01); *G06K 9/0008* (2013.01)

(58) Field of Classification Search
CPC ..................... G06K 9/0002; G06K 9/0008
(Continued)

(56) References Cited

U.S. PATENT DOCUMENTS

| 6,438,257 B1 * | 8/2002 | Morimura | .......... G01R 27/2605 |
| | | | 382/108 |
| 7,683,640 B2 * | 3/2010 | Chuang | ................ G06K 9/0002 |
| | | | 324/649 |

(Continued)

FOREIGN PATENT DOCUMENTS

| JP | 2001-311752 | 11/2001 |
| JP | 2002-287887 | 10/2002 |

(Continued)

*Primary Examiner* — Sheela C Chawan
(74) *Attorney, Agent, or Firm* — Lex IP Meister, PLLC

(57) ABSTRACT

The present invention relates to a capacitive fingerprint sensor, and the capacitive fingerprint sensor includes: a fingerprint sensor electrode for sensing a fingerprint of a human body; a first transistor of which a current or an output voltage is changed according to a voltage change of capacitive coupling formed by fingerprint capacitance formed when a fingerprint contacts the fingerprint sensor electrode and coupling capacitance formed for capacitive coupling; a fifth transistor that resets a gate electrode of the first transistor and applies capacitive coupling to the gate electrode of the first transistor through a coupling pulse; a second transistor of which a current or an output voltage is changed due to a difference in the current flowing through the first transistor and a gate voltage is maintained by a capacitor; a third transistor that resets a gate electrode of the second transistor; and a fourth transistor that controls a current flowing through the second transistor or an output voltage of the second transistor and transmits the controlled current or output voltage to a readout circuit.

24 Claims, 29 Drawing Sheets

(58) Field of Classification Search
USPC .............. 382/124, 100, 115, 312, 125, 108;
324/649, 658, 661, 662, 663; 250/200,
250/206, 555, 556; 257/213, 215, 225,
257/231, 233, 414, 415, 417, 288, 347,
257/350; 340/5.1, 5.2, 5.8, 5.81, 5.82,
340/5.83, 5.51, 5.52, 5.53; 356/71
See application file for complete search history.

(56) References Cited

U.S. PATENT DOCUMENTS

| 8,373,443 | B2* | 2/2013 | Koyama | H01L 27/1225 |
| | | | | 257/268 |
| 9,048,117 | B2* | 6/2015 | Miyake | G09G 3/3677 |
| 9,083,334 | B2* | 7/2015 | Koyama | H01L 27/1225 |
| 9,543,773 | B2* | 1/2017 | Momo | H02J 7/0057 |

FOREIGN PATENT DOCUMENTS

| JP | 2004-093266 | 3/2004 |
| KR | 10-2012-0121228 | 11/2012 |
| KR | 10-1376228 | 4/2014 |

* cited by examiner

CAPACITIVE FINGERPRINT SENSOR

CROSS-REFERENCE TO RELATED APPLICATION

This application claims priority to and the benefit of Korean Patent Application No. 10-2015-0049655 filed in the Korean Intellectual Property Office on Apr. 8, 2015, the entire contents of which are incorporated herein by reference.

BACKGROUND OF THE INVENTION

(a) Field of the Invention

An exemplary embodiment of the present invention relates to a capacitive fingerprint sensor.

(b) Description of the Related Art

FIG. 1 shows a capacitive fingerprint sensor according to a conventional art.

As shown in FIG. 1, a capacitive fingerprint sensor according to a conventional art has a structure in which a thin film transistor T3 is provided to serve a diode element to reset a gate voltage of a thin film transistor T1 so that a capacitance difference can be primarily sensed and amplified and then secondarily amplified again.

A problem in a technology of the conventional capacitive fingerprint sensor will be described with reference to a mechanism of a p-type thin film transistor. A conductor is influenced by an electrical signal at the periphery thereof, and particularly, it is greatly influenced by an AC signal. When the conductor receives an AC signal of 50 Hz or 60 Hz, the conventional capacitive fingerprint sensor may experience an after-image. A gate electrode of the thin film transistor T1 is a fingerprint sensor electrode and is exposed to the outside, thereby being easily influenced by noise from the external environment.

As shown in FIG. 1, the conventional capacitive fingerprint sensor provides a function of a diode and the like by using the thin film transistor T3. In such a case, when a clock signal having a high voltage and a low voltage repeated at regular intervals is applied to ΔVpulse, the thin film transistor T3 maintains a turned-on state when the ΔVpulse is applied with the high voltage, and thus a current flows so that a gate voltage of the thin film transistor T1 is set to the high voltage of the ΔVpulse.

When the ΔVpulse is applied with the low voltage, the thin film transistor T3 maintains a turned-off state and thus a gate node of the floated thin film transistor T1 is decreased to a low voltage due to capacitive coupling, and the low voltage is changed depending on capacitance Cfp due to a fingerprint, and accordingly, valleys and ridges of the fingerprint can be sensed.

However, when the thin film transistor is diode-connected like the thin film transistor T3 of the conventional capacitive fingerprint sensor, a current flows only in one direction through the thin film transistor T3, thereby causing an afterimage in an image. That is, after the gate voltage of the thin film transistor T1 is setup as a high voltage of ΔVpulse, the gate voltage of the thin film transistor T1, which has been setup as the high voltage by ΔVpulse, is increased by an external AC noise frequency of 50 Hz or 60 Hz.

When a low voltage of ΔVpulse is applied, the thin film transistor T3 enters the turned-off state, and a gate node of the floated thin film transistor T1 may continuously maintain the high voltage due to capacitive coupling even through it should be decreased to a low voltage, due to the external AC noise frequency interference.

That is, when the gate voltage of the thin film transistor T1 continuously maintain a high voltage, the thin film transistor T2 may be continuously maintained at the turned-off state, and the gate voltage of the thin film transistor T1 will be more increased due to the external AC noise frequency interference, thereby continuously maintaining an afterimage until the gate voltage is decreased to a level of an initial setup voltage.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to improve sensitivity by sensing and amplifying a capacitance difference and then again amplifying the amplified signal in the corresponding pixel, and prevent an occurrence of afterimage due to a noise from the external environment.

A capacitive fingerprint sensor according to an exemplary embodiment of the present invention includes: a fingerprint sensor electrode for sensing a fingerprint of a human body; a first transistor of which a current or an output voltage is changed according to a voltage change of capacitive coupling formed by fingerprint capacitance formed when a fingerprint contacts the fingerprint sensor electrode and coupling capacitance formed for capacitive coupling; a fifth transistor that resets a gate electrode of the first transistor and applies capacitive coupling to the gate electrode of the first transistor through a coupling pulse; a second transistor of which a current or an output voltage is changed due to a difference in the current flowing through the first transistor and a gate voltage is maintained by a capacitor; a third transistor that resets a gate electrode of the second transistor; and a fourth transistor that controls a current flowing through the second transistor or an output voltage of the second transistor and transmits the controlled current or output voltage to a readout circuit.

According to another exemplary embodiment of the present invention, the coupling pulse may be formed of a clock signal having a high voltage and a low voltage that are repeated, and the clock signal may be continuously applied during one frame.

According to the other exemplary embodiment of the present invention, the coupling pulse may be changed to a low voltage once when a scan signal is applied to the corresponding pixel while maintaining a high voltage for one frame, or may be changed to a high voltage once when the scan signal is applied to the corresponding pixel while maintaining a low voltage for one frame.

According to the other exemplary embodiment of the present invention, the gate electrode of the first transistor may be reset by the high voltage or the low voltage of the coupling pulse.

According to the other exemplary embodiment the present invention, the gate electrode of the second transistor may be reset by the high voltage or the low voltage of the coupling pulse.

According to the other exemplary embodiment of the present invention, the fingerprint capacitance may be formed by an active layer, which is a fingerprint sensor electrode, a gate insulation layer, an intermediate insulation layer, a first passivation layer, a second passivation layer, and a fingerprint, and the fingerprint capacitance may be changed according to height differences of ridges and valleys of the fingerprint.

According to the other exemplary embodiment of the present invention, the coupling capacitance may be formed by the active layer, the gate insulation layer, the intermediate insulation layer, and the data electrode, or may be formed by lateral capacitance between active layers.

According to the other exemplary embodiment of the present invention, the fingerprint capacitance may be formed by a gate electrode, which is a fingerprint sensor electrode, an intermediate insulation layer, a first passivation layer, a second passivation layer, and a fingerprint, and may be changed according to height differences of ridges and valleys of the fingerprint.

According to the other exemplary embodiment of the present invention, the coupling capacitance may be formed by the gate electrode, the intermediate insulation layer, and the data electrode, or may be formed of lateral capacitance between gate electrodes.

According to the other exemplary embodiment of the present invention, the fingerprint capacitance may be formed of a fingerprint, a data electrode, which is a fingerprint sensor electrode, a first passivation layer, a second passivation layer, and a fingerprint, and may be changed according to height differences of ridges and valleys.

According to the other exemplary embodiment of the present invention, the coupling capacitance may be formed by a gate electrode, an intermediate insulation layer, and the data electrode, may be formed by an active layer, a gate insulation layer, the intermediate insulation layer, and the data electrode, or may be formed by lateral capacitance between data electrodes.

According to the other exemplary embodiment of the present invention, the fingerprint capacitance may be formed by a ground electrode, which is the fingerprint sensor electrode, a second passivation layer, and a fingerprint, and may be changed according to height differences of ridges and valleys.

According to the other exemplary embodiment of the present invention, the coupling capacitance may be formed by a gate electrode, an intermediate insulation layer, and a data electrode, may be formed by an active layer, a gate insulation layer, the intermediate insulation layer, and the data electrode, or may be formed by lateral capacitance between data electrodes.

According to the other exemplary embodiment of the present invention, the capacitive fingerprint sensor may control the amount of current flowing through the first transistor and the amount of current flowing through the second transistor by adjusting a voltage level of the coupling pulse signal.

According to the other exemplary embodiment of the present invention, the capacitive fingerprint sensor may include at least one of an n-type transistor and a p-type transistor.

According to the other exemplary embodiment of the present invention, a shift resistor may be embedded or separately provided in the capacitive fingerprint sensor.

According to the other exemplary embodiment of the present invention, one of the first, second, third, fourth, and fifth transistors may have one of a coplanar structure, an inverted staggered structure, and a staggered structure.

According to the other exemplary embodiment of the present invention, the first passivation layer and the second passivation layer may be formed of a flat layer material or a non-flat layer material.

According to the other exemplary embodiment of the present invention, the flat layer material may be formed of a Si—O—Si inorganic material and an organic hybrid silicon polymer.

According to the other exemplary embodiment of the present invention, the first passivation layer and the second passivation layer may include at least one of Si, O, Al, Ca, Mo, Cu, and C.

According to the other exemplary embodiment of the present invention, the first passivation layer may be formed of a photosensitive polyimide, and second passivation layer may include at least one of Si, O, Al, Ca, Mo, Cu, and C.

According to the other exemplary embodiment of the present invention, the first passivation layer may be formed of a Si—O—Si inorganic material and an organic hybrid silicon polymer, and the second passivation layer may be formed of a photosensitive polyimide.

According to the other exemplary embodiment of the present invention, the first passivation layer and the second passivation layer may be formed of a photosensitive polyimide.

According to the other exemplary embodiment of the present invention, the first passivation layer and the second passivation layer may include an imide.

According to the other exemplary embodiment of the present invention, the first passivation layer and the second passivation layer may include at least one of Si, O, Al, Ca, Mo, Cu, and C.

According to the exemplary embodiment of the present invention, a capacitance difference is primarily sensed and amplified, and the amplified signal is amplified again in a pixel to thereby improve sensitivity and prevent an occurrence of afterimage due to a noise from the external environment.

DETAILED DESCRIPTION OF THE EMBODIMENTS

Figure 1:
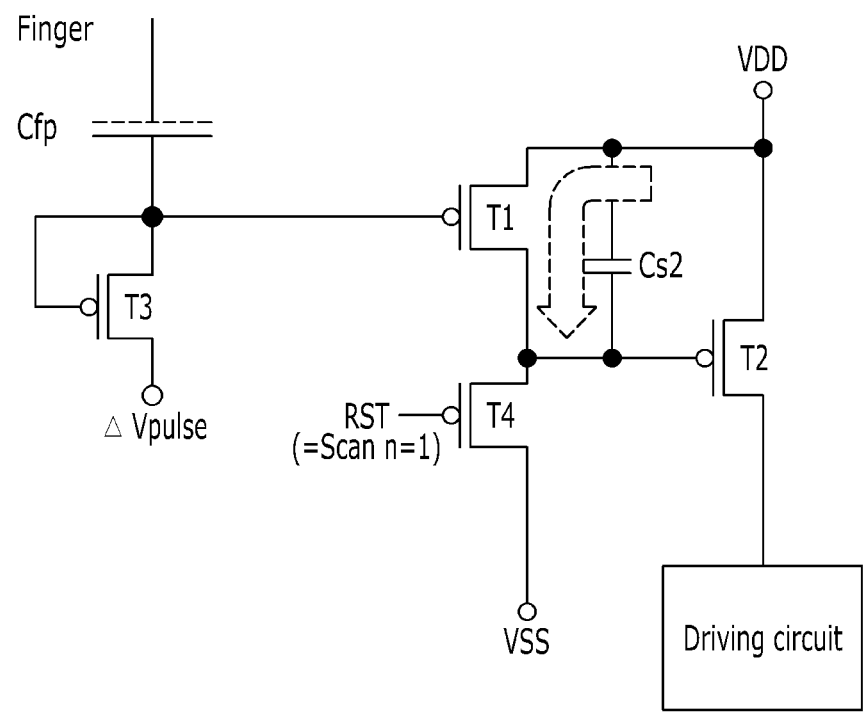
FIG. 1 shows a conventional capacitive fingerprint sensor.

The present invention will be described more fully hereinafter with reference to the accompanying drawings, in which preferable example embodiments of the invention are shown. In the description of the present invention, the detailed description of related well-known configurations and functions is not provided, when it is determined as unnecessarily making the scope of the present invention unclear. Further, the size of each element in the drawings may be exaggerated for ease of explanation and does not mean the size actually applied.

Figure 2:
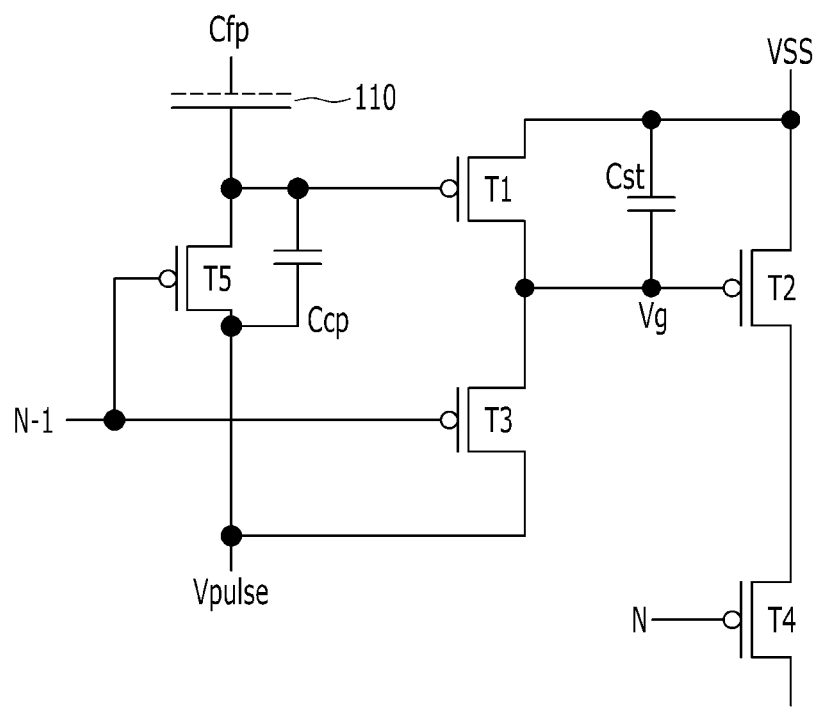
FIG. 2 is a circuit diagram of a capacitive fingerprint sensor according to an exemplary embodiment of the present invention.
Figure 3:
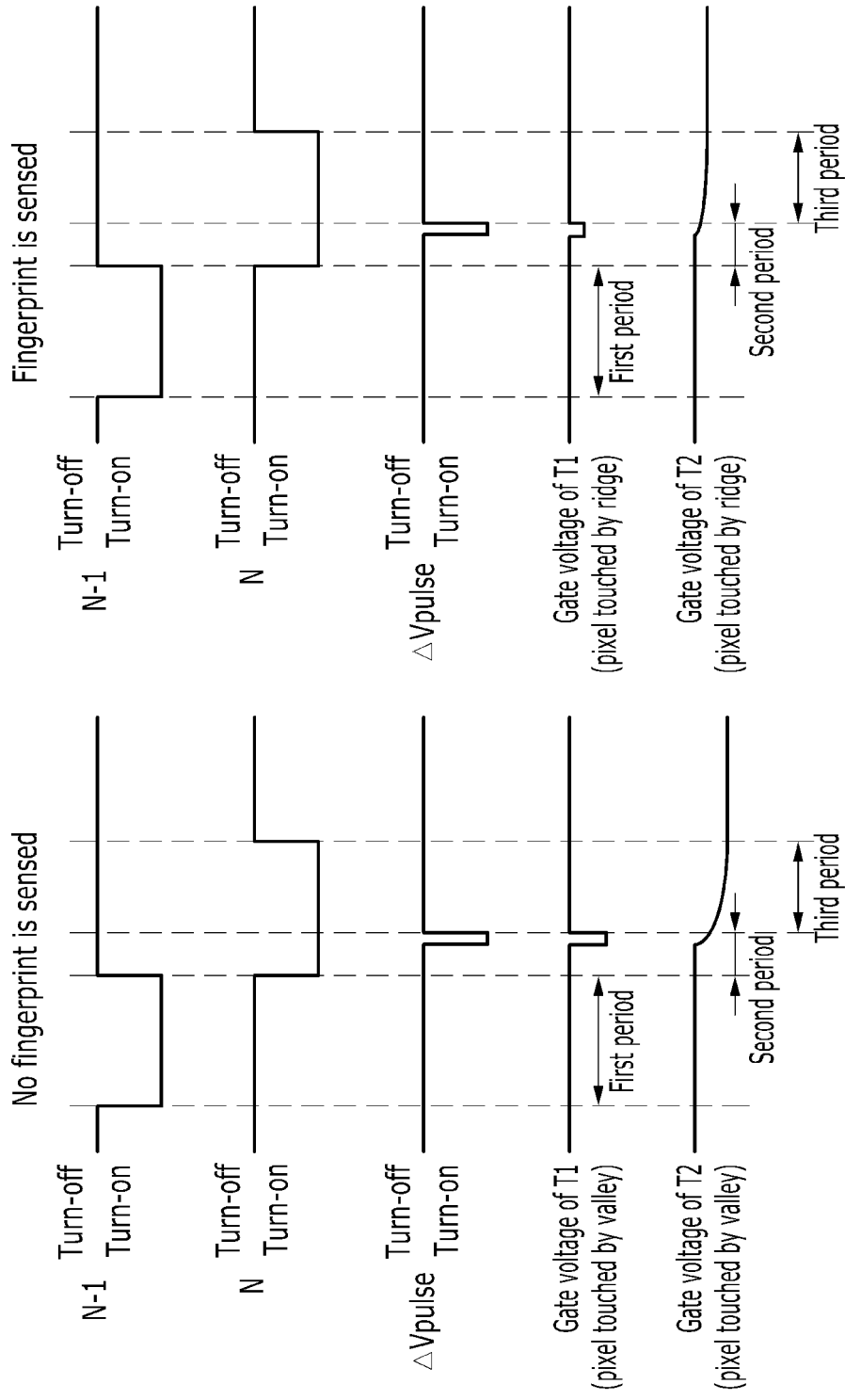
FIG. 3 is a timing diagram for driving of the capacitive fingerprint sensor according to the exemplary embodiment of the present invention.

FIG. 2 is a circuit diagram of a capacitive fingerprint sensor according to an exemplary embodiment of the present invention, and FIG. 3 is a timing diagram for driving of the capacitive fingerprint sensor according to the exemplary embodiment of the present invention.

Referring to FIG. 2 and FIG. 3, the capacitive fingerprint sensor according to the exemplary embodiment of the present invention will now be described.

A thin film transistor according to the exemplary embodiment of the present invention includes a fingerprint sensor electrode 110, a first transistor T1, a second transistor T2, a third transistor T3, a fourth transistor T4, and a fifth transistor T5.

The fingerprint sensor electrode 110 senses a fingerprint of a human body.

An amount of a current of the first transistor T1 is changed according to a voltage change of capacitive coupling formed by fingerprint capacitance Cfp formed on the fingerprint sensor electrode in accordance with contact of the fingerprint and a coupling capacitor Ccp formed for capacitive coupling.

The fifth transistor T5 resets a gate electrode of the first transistor T1, and capacitive-couples the gate electrode of the first transistor T1 through a coupling pulse.

In this case, the coupling pulse is formed of a clock signal having a high voltage and a low voltage repeated at regular intervals, and the clock signal may be continuously applied for one frame. The coupling pulse may be changed to the low voltage once when a scan signal is applied to the corresponding pixel while maintaining the high-voltage for one frame period, or may be changed to the high voltage once when the scan signal is applied to the corresponding pixel while maintaining the low voltage for one frame period.

In this case, the gate electrode of the first transistor T1 and a gate electrode of the second transistor T2 may be reset by the high voltage or the low voltage of the coupling pulse.

A gate voltage of the second transistor T2 is changed by the current flowing through the first transistor T1 or an output voltage of the first transistor T1, and a capacitor Cst is connected to the second transistor T2 to maintain the gate voltage. That is, the gate voltage of the second transistor T2 is maintained by the capacitor Cst.

In addition, the third transistor T3 resets the gate electrode of the second transistor T2, and controls a current flowing through the second transistor T2 or an output voltage of the second transistor T2 and transmits the controlled current or output voltage to a readout circuit.

Referring to FIG. 2, in a first period (refer to FIG. 3), when a voltage of a scan line pulse connected to N−1 becomes a low voltage, the third transistor T3 and the fifth transistor T5 are turned on. In this case, a voltage of the ΔVpulse maintains a high voltage, and the high voltage is setup as gate voltages of the third transistor T3 and the fifth transistor T5.

In addition, in a second period, the voltage of the scan line pulse connected to N−1 becomes a high voltage and thus the third transistor T3 and the fifth transistor T5 are turned off. In this case, a voltage of a scan line pulse connected to N becomes a low voltage and thus the fourth transistor T4 is turned on. Next, when the voltage of ΔVpulse is decreased to a low voltage after maintaining a high voltage, the fifth transistor T5 is turned off, and a gate node of the first transistor T1 is decreased to a low voltage due to capacitive coupling.

Further, in a third period, a multiplexer and the like connected with a data line of a pixel is turned on and thus a data signal is read out and reset, and after reading data, a voltage of the scan line pulse connected to N becomes a high voltage and thus the fourth transistor T4 is turned off.

Next, the first, second, and third periods are repeated to operate the fingerprint sensor of the exemplary embodiment of the present invention.

FIG. 3 is a timing diagram provided for description of operation, and a pulse width shown in the drawing may be changed and pulse timing can be changed.

The thin film transistor according to the exemplary embodiment of the present invention may be provided as an n-type transistor or a p-type transistor, or the n-type transistor and the p-type transistor are combined and then integrated in the pixel.

Hereinafter, the thin film transistor will be described as a p-type thin film transistor, and an operation mechanism of the p-type thin film transistor will be described.

A scan line pulse having a high voltage and a low voltage repeated at regular intervals is applied in N−1 of FIG. 3, and when the voltage of the scan line pulse is a high voltage, the third transistor T3 and the fifth transistor T5 are turned on.

In this case, the gate electrode of the first transistor T1 and the gate electrode of the second transistor T2 are simultaneously setup with a high voltage of the coupling pulse ΔVpulse having a clock signal in which a high voltage and a low voltage are repeated at regular intervals.

Next, the (N−1)-th scan line pulse becomes a high voltage and thus the third transistor T3 and the fifth transistor T5 are turned off.

The N-th scan line pulse is then applied and the voltage of the scan line pulse becomes a low voltage so that the fourth transistor T4 is turned on.

Subsequently, when a voltage of the coupling pulse ΔVpulse is applied as a low voltage from a high voltage, the gate node of the first transistor T1 that is floated due to the fifth transistor T5 in the turned-off state is decreased to a low voltage due to capacitive coupling. In this case, the capacitance coupling is determined as given in Equation 1.

$$\Delta V_{g\_T1} = \frac{C_{cp}}{C_{cp} + C_{fp}} \times \Delta V_{pulse} \qquad \text{[Equation 1]}$$

In this case, $\Delta V_{g\_T1}$ denotes a change of a gate voltage due to capacitive coupling of the first transistor T1, Ccp denotes a coupling capacitor for capacitive coupling, Cfp denotes capacitance generated by a fingerprint, and ΔVpulse denotes a coupling pulse.

A difference occurs in the gate voltage of the first transistor T1 by the capacitive coupling as shown in Equation 1 due to a capacitance difference, and a current flowing to the first transistor T1 is changed by as much as a difference of the gate voltage.

The gate voltage of the second transistor T2 is discharged by the current flowing to the first transistor T1, and when the coupling pulse ΔVpulse is continuously applied during one frame, the gate voltage of the second transistor T2 is determined by a degree of the discharge of the gate voltage of the second transistor T2, and the amount of current flowing through the second transistor T2 is changed according to the gate voltage of the second transistor T2.

The current flowing through the second transistor T2, which changes according to the gate voltage of the second transistor T2, is transmitted to the readout driving circuit through the fourth transistor T4 so that a fingerprint can be distinguished.

In addition, since the high voltage of the coupling pulse ΔVpulse is used as a gate reset voltage of the first and second transistors T1 and T2, operation ranges of the first transistor T1 and the second transistor T2 can be controlled by adjusting a voltage level of the coupling pulse ΔVpulse.

In addition, the fifth transistor T5 can control the gate voltage rather than being connected by two terminals like a diode that cannot control a gate voltage as in the conventional capacitive fingerprint sensor, and thus the gate node (i.e., fingerprint sensor electrode node) of the first transistor T1 is not continuously charged with a voltage caused by noise even through external AC frequency noise interference occurs at the gate node, thereby preventing an afterimage of a fingerprint image.

When a fingerprint sensor using a thin film transistor is developed by using a capacitive fingerprint sensor having the above-described structure, sensing of a fingerprint can be improved and a fingerprint sensor having strong durability with respect to noise from the external environment can be provided.

Figure 4:
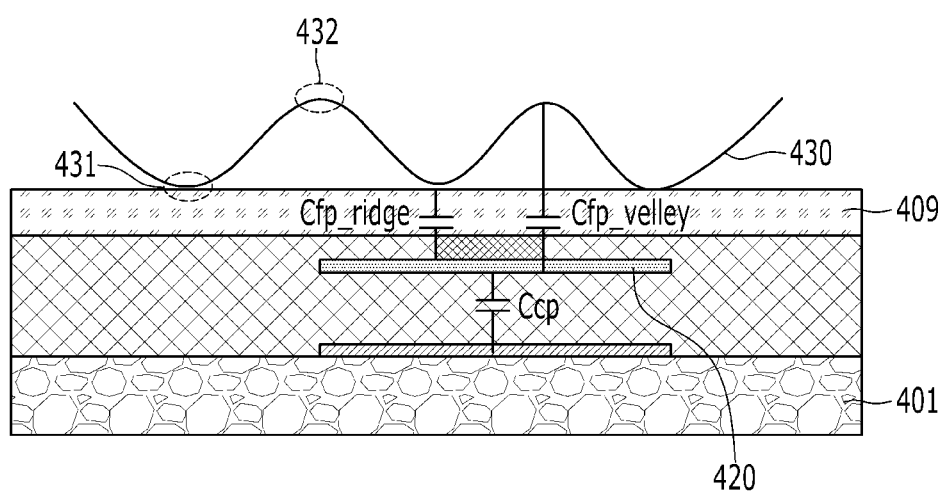
FIG. 4 is provided for description of capacitance according to the exemplary embodiment of the present invention.

FIG. 4 is provided for description of capacitance according to the exemplary embodiment of the present invention.

As shown in FIG. 4, a fingerprint 430 has a height difference due to ridges 431 and valleys 432, and capacitance Cfp_ridge between the ridge 431 and a fingerprint sensor electrode 420 and capacitance Cfp_valley between a valley 432 and the fingerprint sensor electrode 420 are different from each other.

FIG. 5 to FIG. 24 show cross-sectional views of capacitive fingerprint sensors according to exemplary embodiments of the present invention.

As shown in FIG. 5 to FIG. 24, a capacitive fingerprint sensor according to the exemplary embodiment of the present invention includes a substrate 401, an active layer 402, a gate insulation layer 403, a gate electrode 404, an intermediate insulation layer 405, a data electrode 406, a first passivation layer 407, a ground electrode 408, and a second passivation layer 409.

Figure 5:
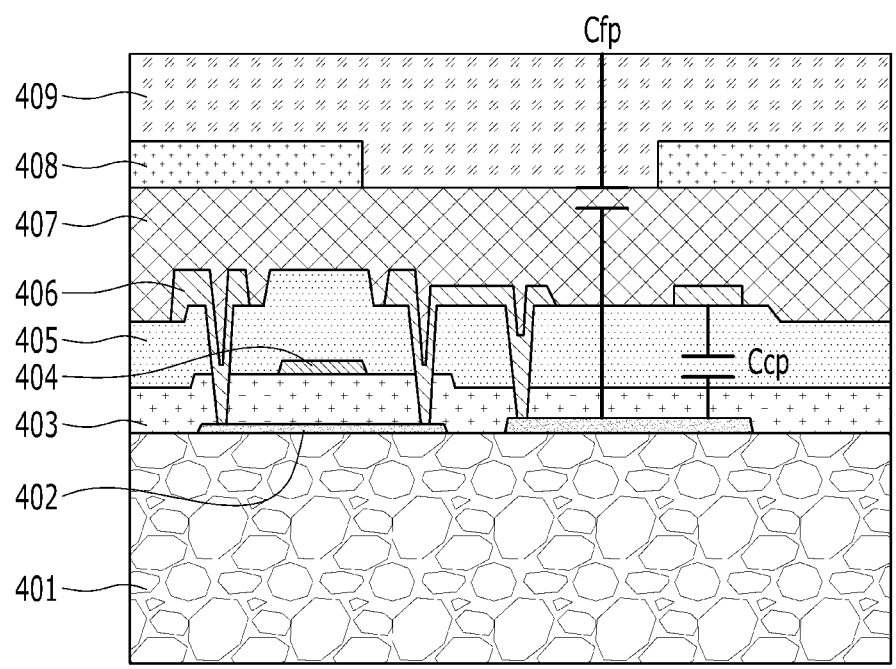
FIG. 5 to FIG. 24 show cross-sectional views of capacitive fingerprint sensors according to exemplary embodiments of the present invention.

In the capacitive fingerprint sensor shown in FIG. 5, the fingerprint sensor electrode is formed of the active layers 402, and a coupling capacitor Ccp is formed by the active layer 402 and the data electrode 406, fingerprint capacitance Cfp is formed by the active layer 402, which is the fingerprint sensor electrode, the gate insulation layer 403, the intermediate insulation layer 405, the first passivation layer 407, the second passivation layer 409, and a fingerprint, and the fingerprint capacitance Cfp is changed according to height differences of ridges and valleys.

In this case, the first passivation layer 407 is formed of a photosensitive polyimide, and the second passivation layer 409 may include at least one of Si, O, Al, Ca, Mo, Cu, and C.

In addition, according to another exemplary embodiment of the present invention, the first passivation layer 407 may include at least one of Si, O, Al, Ca, Mo, Cu, and C and the second passivation layer 409 may be formed of a photosensitive polyimide, and according to still another exemplary embodiment of the present invention, the first passivation layer 407 and the second passivation layer 409 may be formed of a photosensitive polyimide.

Figure 6:
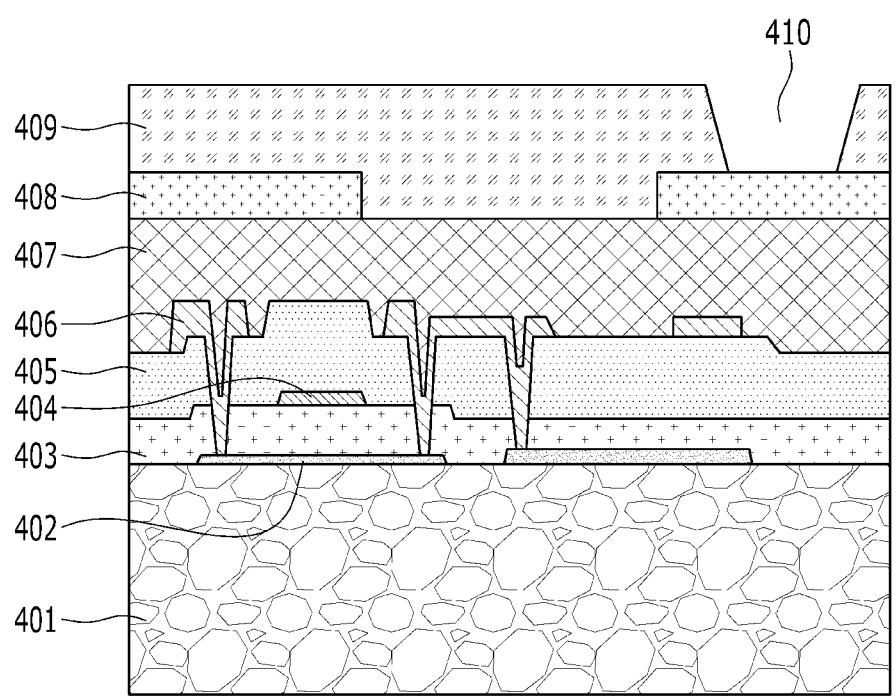

The capacitive fingerprint sensor of FIG. 6 is similar to the capacitive fingerprint sensor of FIG. 5 in structure, but a via hole 410 is formed in the second passivation layer 409 to expose a ground electrode 408 to thereby prevent influence of noise and static electricity from the external environment.

In this case, the ground electrode 408 may be formed by including at least one of Mo, Al, W, Ti, Cu, ITO, IZO, and IXO.

Figure 7:
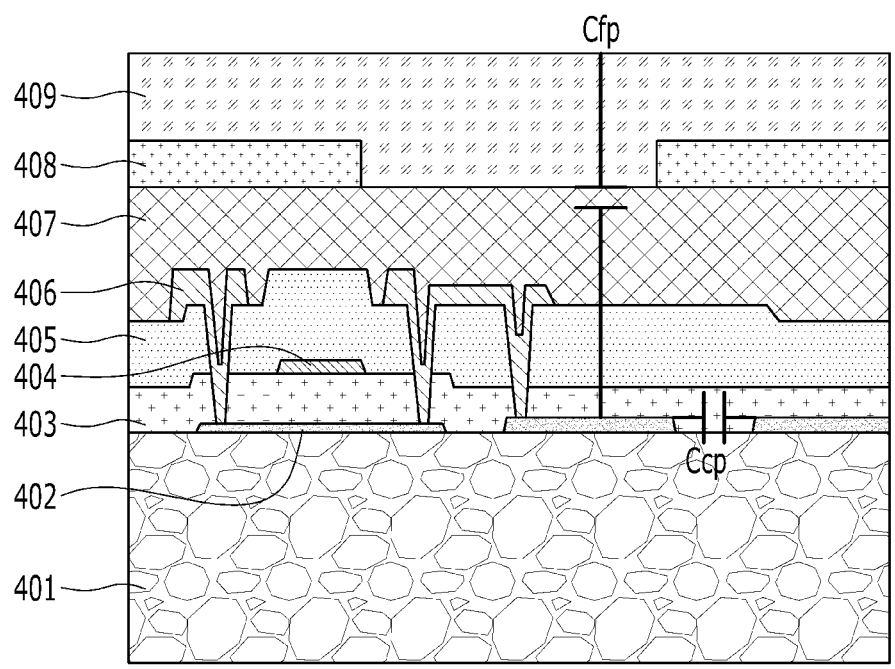

In a capacitive fingerprint sensor of FIG. 7, a fingerprint sensor electrode is formed of active layers 402, and a coupling capacitor Ccp is formed of lateral capacitance between active layers 402.

Figure 8:
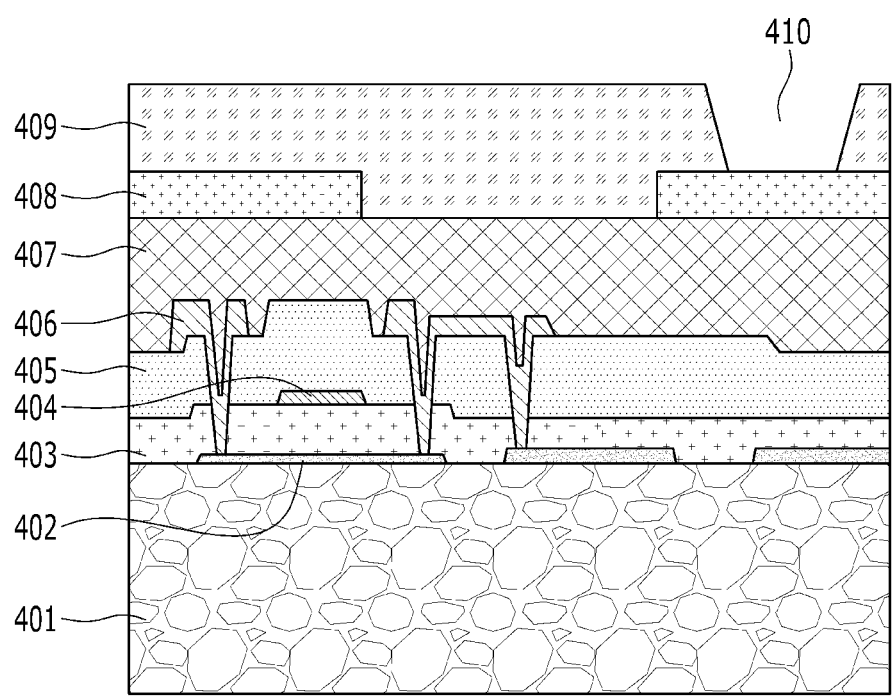

A capacitive fingerprint sensor of FIG. 8 is similar to the capacitive fingerprint sensor of FIG. 7 in structure, but a via hole 410 is formed in a second passivation layer 409 to expose a ground electrode 408 to thereby prevent influence of noise and static electricity from the external environment.

In this case, the ground electrode 408 may be formed by including at least one of Mo, Al, W, Ti, Cu, ITO, IZO, and IXO.

Figure 9:
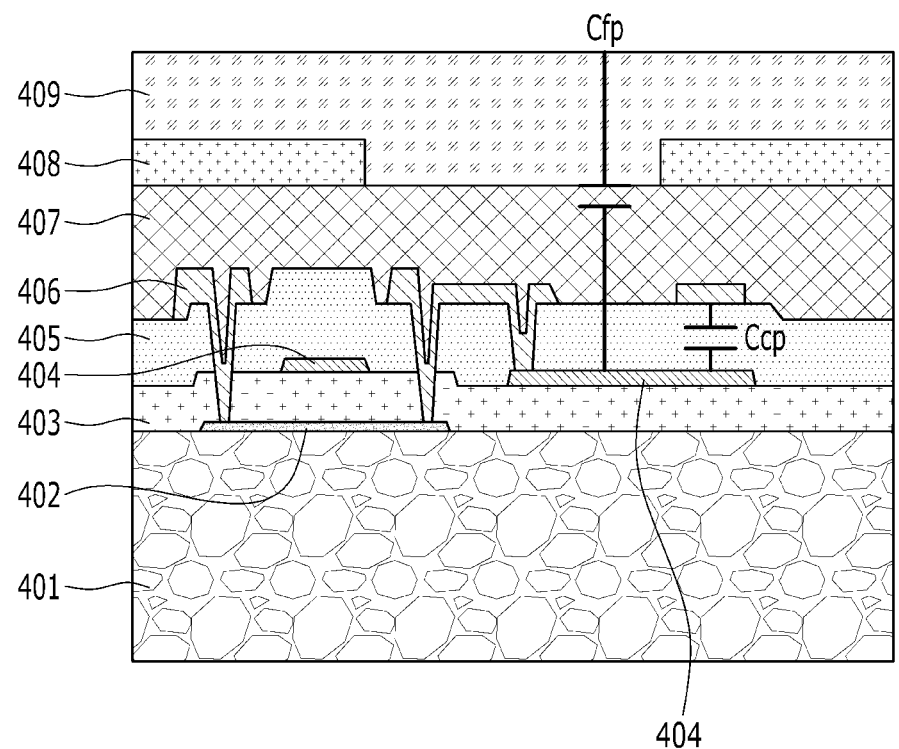

In a capacitive fingerprint sensor of FIG. 9, a fingerprint sensor electrode is formed of a gate electrode 404, a coupling capacitor Ccp is formed of capacitance between the gate electrode 404 and a data electrode 406, fingerprint capacitance Cfp is formed by the gate electrode 404, which is the fingerprint sensor electrode, an intermediate insulation layer 405, a first passivation layer 407, a second passivation layer 409, and a fingerprint, and the fingerprint capacitance Cfp is changed according to height differences of ridges and valleys.

Figure 10:
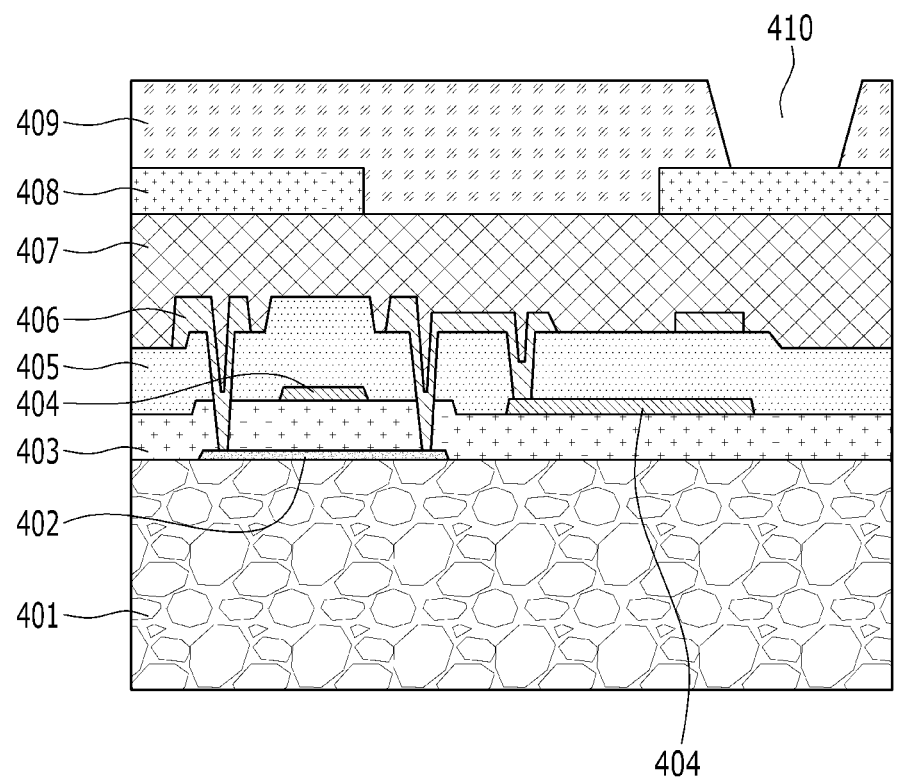

A capacitive fingerprint sensor of FIG. 10 is similar to the capacitive fingerprint sensor of FIG. 9 in structure, but a via hole 410 is formed in the second passivation layer 409 to expose a ground electrode 408 to thereby prevent influence of noise and static electricity from the external environment.

In this case, the ground electrode 408 may be formed by including at least one of Mo, Al, W, Ti, Cu, ITO, IZO, and IXO.

Figure 11:
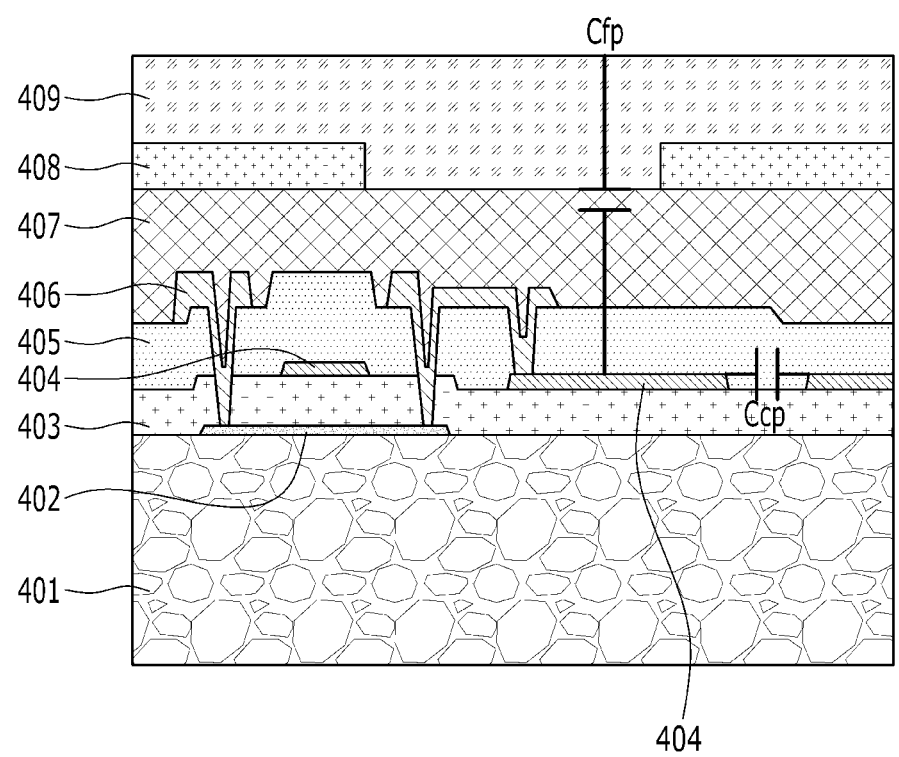

In a capacitive fingerprint sensor of FIG. 11, a fingerprint sensor electrode is formed of gate electrodes 404, and a coupling capacitor Ccp is formed of capacitance between the gate electrodes 404.

Figure 12:
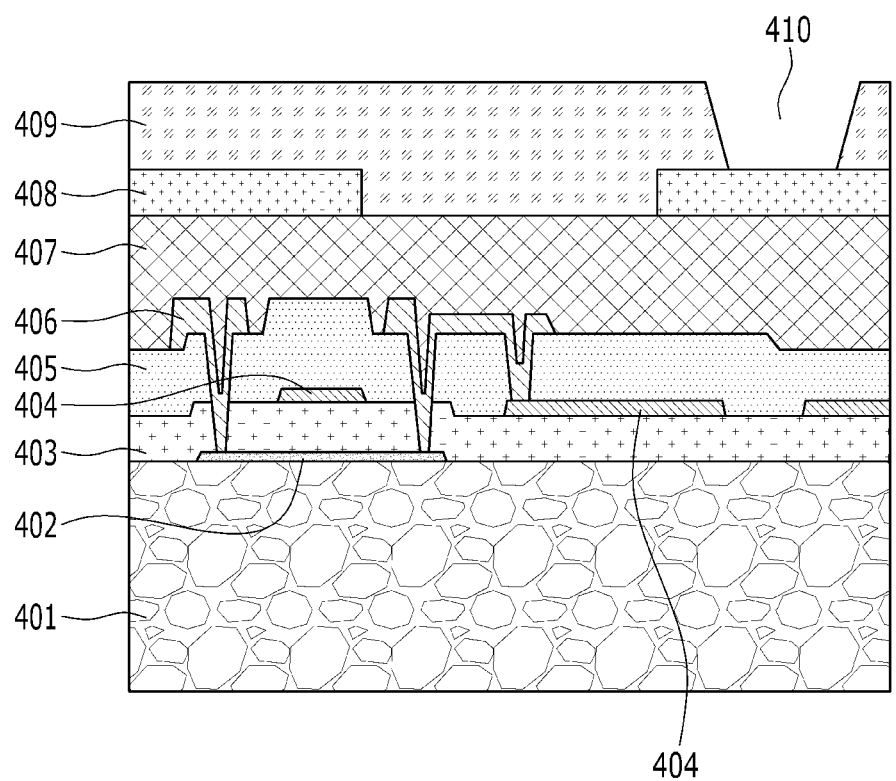

A capacitive fingerprint sensor of FIG. 12 is similar to the capacitive fingerprint sensor of FIG. 11 in structure, but a via hole 410 is formed in the second passivation layer 409 to expose a ground electrode 408 to thereby prevent influence of noise and static electricity from the external environment. In this case, the ground electrode 408 may be formed by including at least one of Mo, Al, W, Ti, Cu, ITO, IZO, and IXO.

Figure 13:
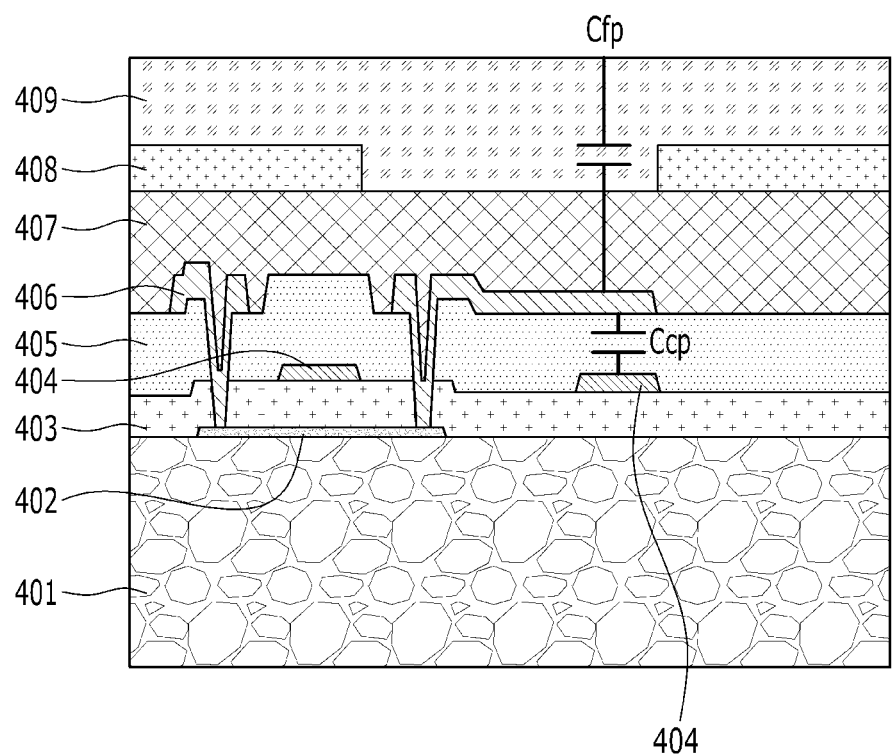

In a capacitive fingerprint sensor of FIG. 13, a fingerprint sensor electrode is formed of a data electrode 406, a coupling capacitor Ccp is formed of capacitance between a gate electrode 404 and the data electrode 406, fingerprint capacitance Cfp is formed by the data electrode 406, which is the fingerprint sensor electrode, a first passivation layer 407, a second passivation layer 409, and a fingerprint, and the fingerprint capacitance Cfp is changed according to height differences of ridges and valleys.

Figure 14:
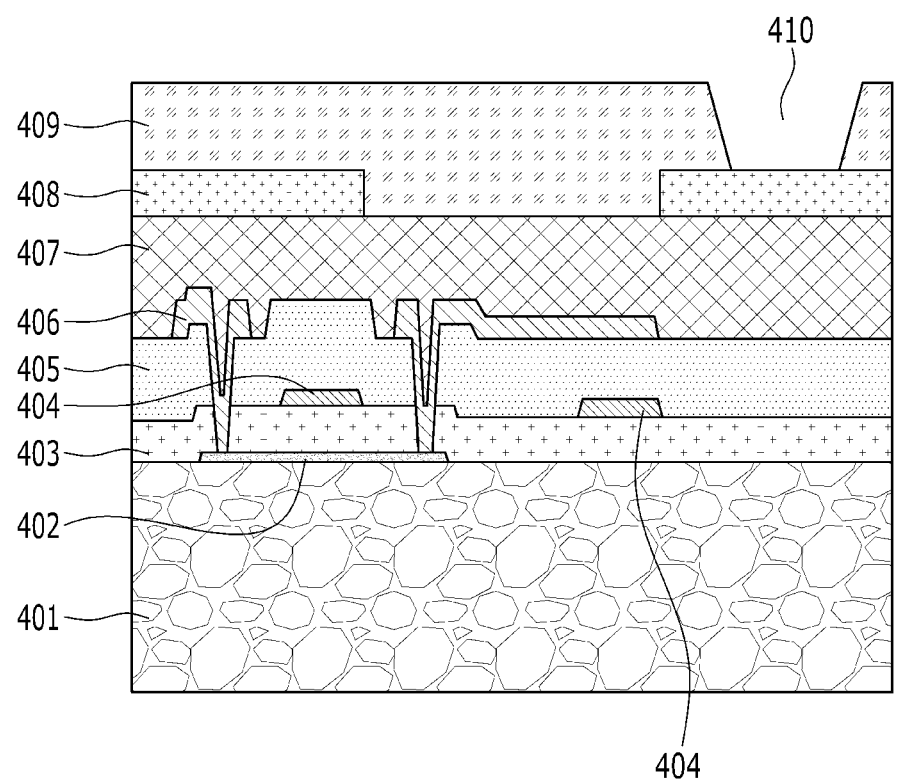

A capacitive fingerprint sensor of FIG. 14 is similar to the capacitive fingerprint sensor of FIG. 13 in structure, but a via hole 410 is formed in the second passivation layer 409 to expose a ground electrode 408 to thereby prevent influence of noise and static electricity from the external environment.

In this case, the ground electrode 408 may be formed by including at least one of Mo, Al, W, Ti, Cu, ITO, IZO, and IXO.

Figure 15:
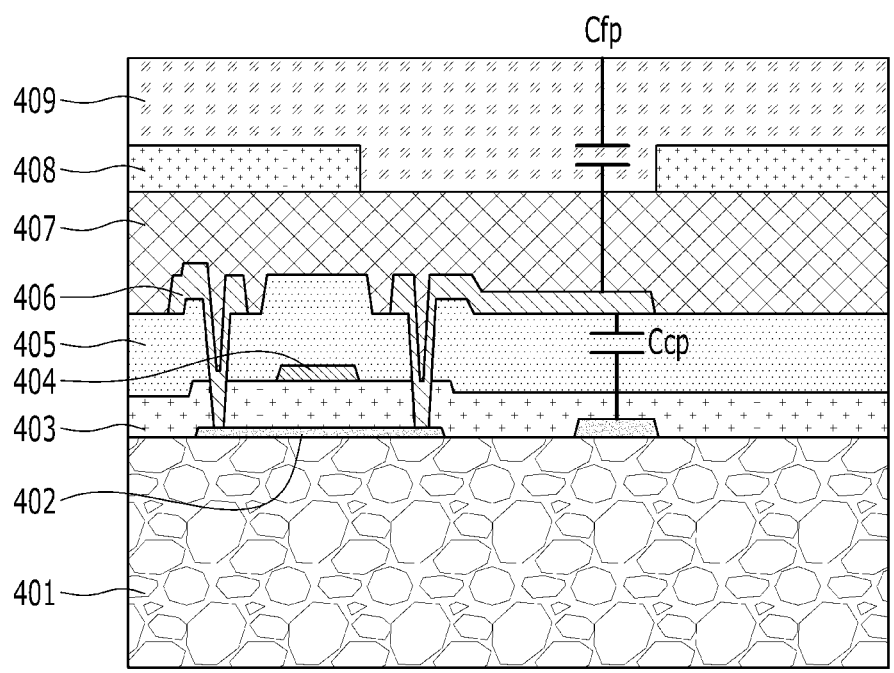

In a capacitive fingerprint sensor of FIG. 15, a fingerprint sensor electrode is formed of a data electrode 406, coupling capacitance Ccp is formed of capacitance between an active layer 402 and the data electrode 406, fingerprint capacitance Cfp is formed by the data electrode 406, which is the fingerprint sensor electrode, a first passivation layer 407, a second passivation layer 409, and a fingerprint, and the fingerprint capacitance Cfp is changed according to height differences of ridges and valleys.

Figure 16:
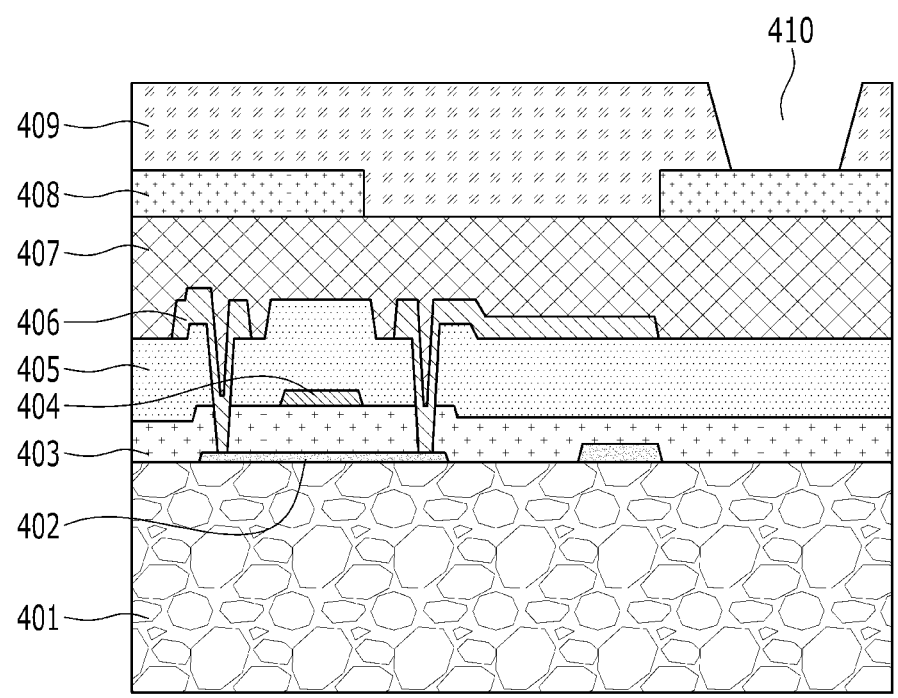

A capacitive fingerprint sensor of FIG. 16 is similar to the capacitive fingerprint sensor of FIG. 15 in structure, but a via hole 410 is formed in the second passivation layer 409 to expose a ground electrode 408 to thereby prevent influence of noise and static electricity from the external environment.

In this case, the ground electrode 408 may be formed by including at least one of Mo, Al, W, Ti, Cu, ITO, IZO, and IXO.

Figure 17:
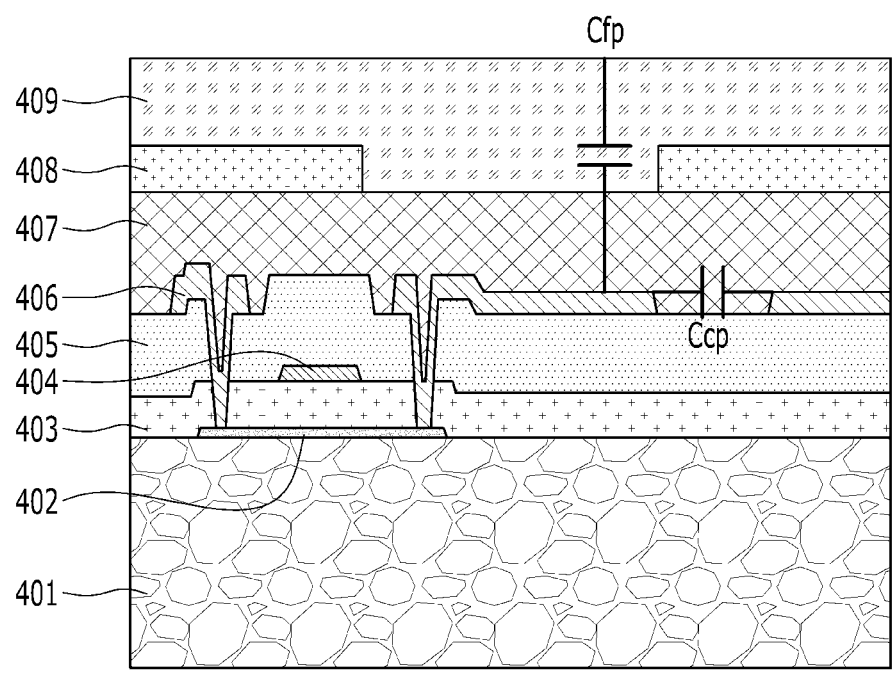

In a capacitive fingerprint sensor of FIG. 17, a fingerprint sensor electrode is formed of a data electrode 406, a coupling capacitor Ccp is formed of lateral capacitance between the data electrodes 406, fingerprint capacitance Cfp is formed by the data electrode 406, which is the fingerprint sensor electrode, a first passivation layer 407, a second passivation layer 409, and a fingerprint, and the fingerprint capacitance Cfp is changed according to height differences of ridges and valleys.

Figure 18:
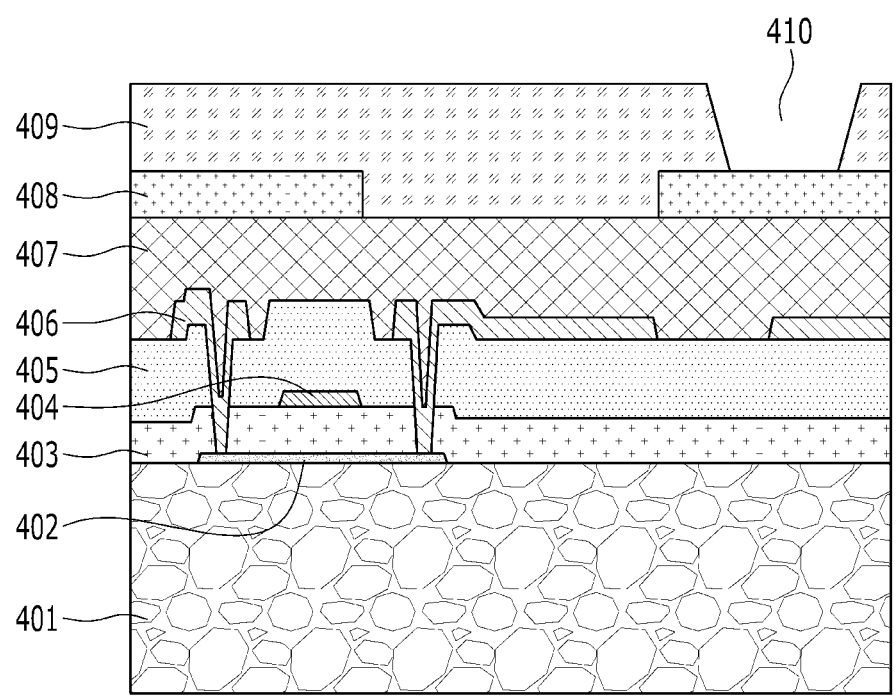

A capacitive fingerprint sensor of FIG. 18 is similar to the capacitive fingerprint sensor of FIG. 17 in structure, but a via hole 410 is formed in the second passivation layer 409 to expose a ground electrode 408 to thereby prevent influence of noise and static electricity from the external environment.

In this case, the ground electrode 408 may be formed by including at least one of Mo, Al, W, Ti, Cu, ITO, IZO, and IXO.

Figure 19:
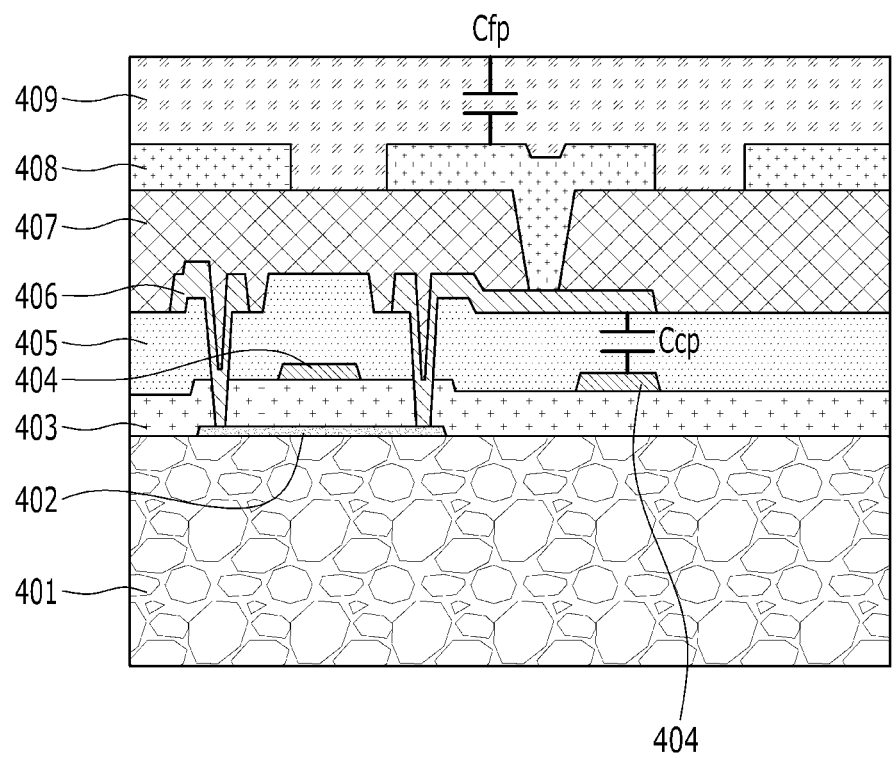

In a capacitive fingerprint sensor of FIG. 19, a fingerprint sensor electrode is formed of a data electrode 406, coupling capacitance Ccp is formed of capacitance between a gate electrode 404 and the data electrode 406, fingerprint capacitance Cfp is formed by a ground electrode 408, which is the fingerprint sensor electrode, a second passivation layer 409, and a fingerprint, and the fingerprint capacitance Cfp is changed according to height differences of ridges and valleys.

Figure 20:
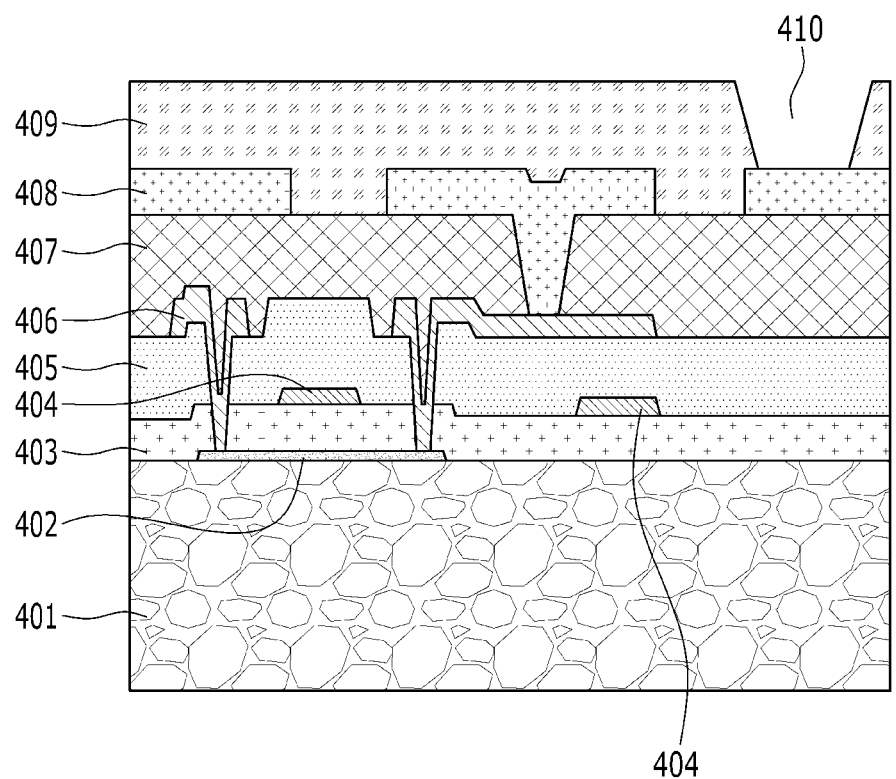

A capacitive fingerprint sensor of FIG. 20 is similar to the capacitive fingerprint sensor of FIG. 19 in structure, but a via hole 410 is formed in the second passivation layer 409 to expose a ground electrode 408 to thereby prevent influence of noise and static electricity from the external environment.

In this case, the ground electrode 408 may be formed by including at least one of Mo, Al, W, Ti, Cu, ITO, IZO, and IXO.

Figure 21:
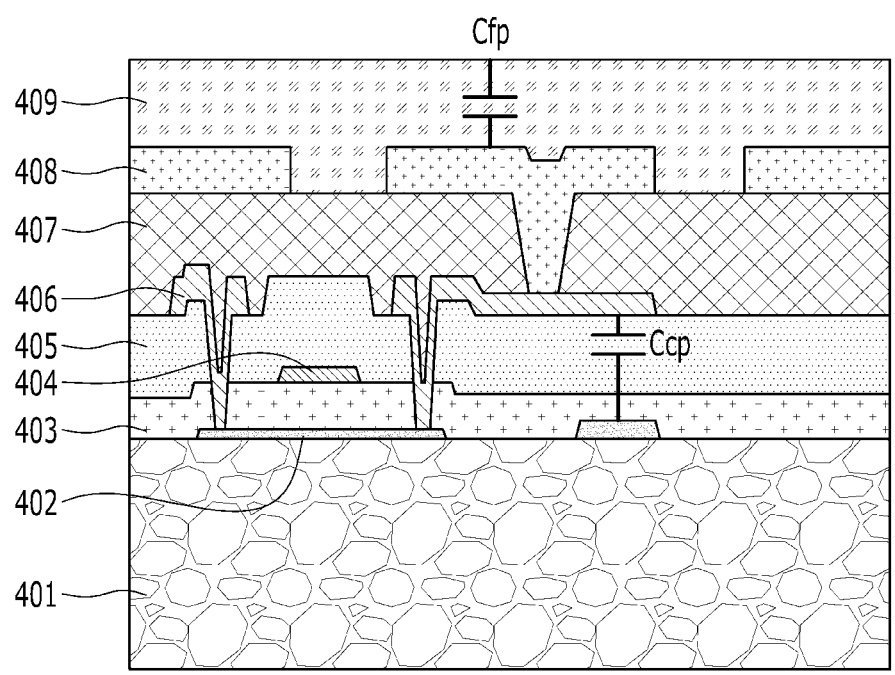

In a capacitive fingerprint sensor of FIG. 21, a fingerprint sensor electrode is formed of a ground electrode 408, a coupling capacitor Ccp is formed of capacitance between an active layer 402 and a data electrode 406, fingerprint capacitance Cfp is formed by the ground electrode 408, which is the fingerprint sensor electrode, a second passivation layer 409, and a fingerprint, and the fingerprint capacitance Cfp is changed according to height differences of ridges and valleys.

Figure 22:
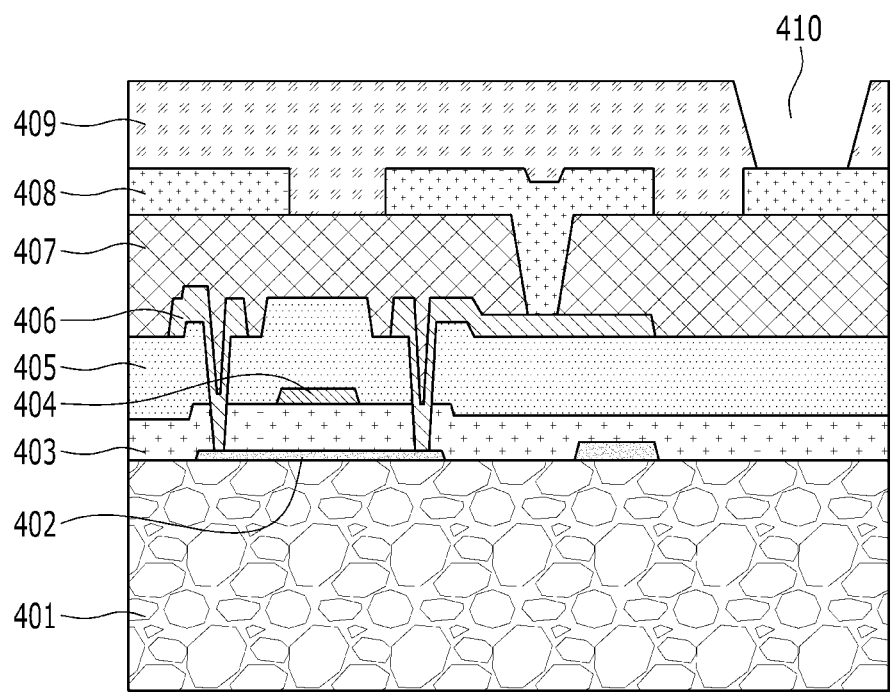

A capacitive fingerprint sensor of FIG. 22 is similar to the capacitive fingerprint sensor of FIG. 21 in structure, but a via hole 410 is formed in the second passivation layer 409 to expose a ground electrode 408 to thereby prevent influence of noise and static electricity from the external environment.

In this case, the ground electrode 408 may be formed by including at least one of Mo, Al, W, Ti, Cu, ITO, IZO, and IXO.

Figure 23:
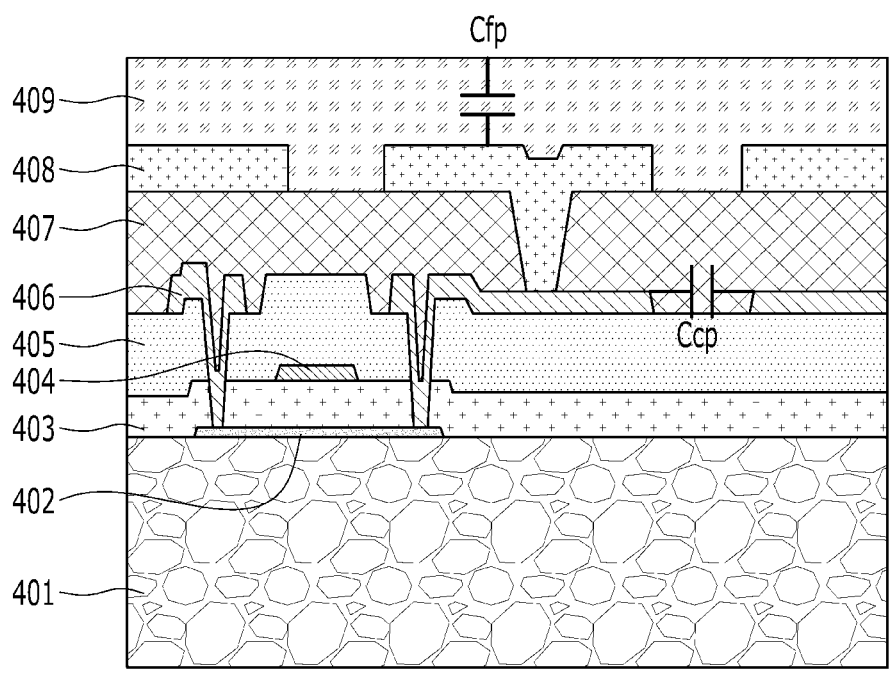

In a capacitive fingerprint sensor of FIG. 23, a fingerprint sensor electrode is formed of a ground electrode 408, a coupling capacitor Ccp is formed of lateral capacitance between the data electrodes 406, fingerprint capacitance Cfp is formed by the ground electrode 406, which is the fingerprint sensor electrode, a second passivation layer 409, and a fingerprint, and the fingerprint capacitance Cfp is changed according to height differences of ridges and valleys.

Figure 24:
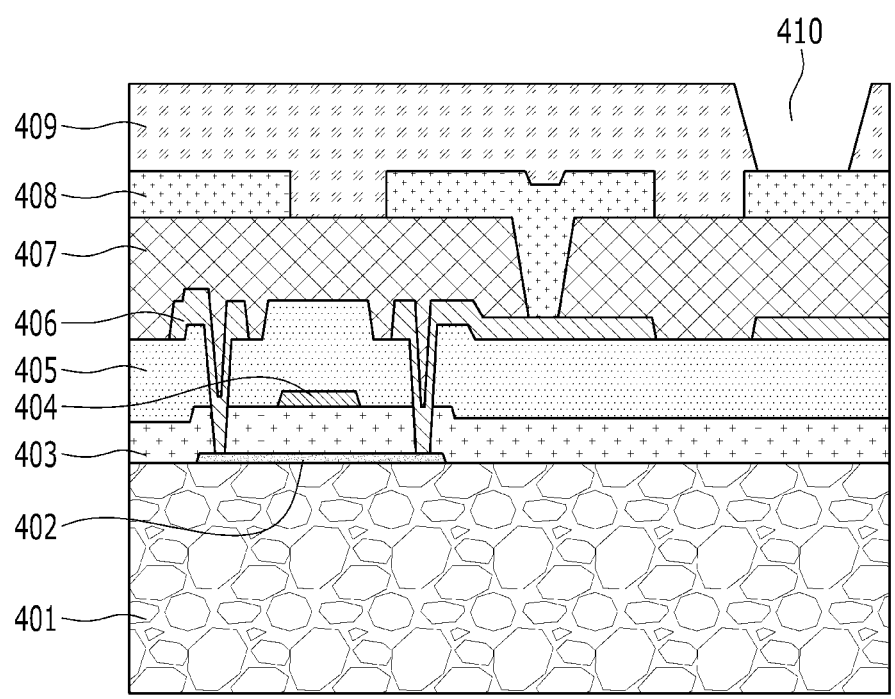

A capacitive fingerprint sensor of FIG. 24 is similar to the capacitive fingerprint sensor of FIG. 23 in structure, but a via hole 410 is formed in the second passivation layer 409 to expose a ground electrode 408 to thereby prevent influence of noise and static electricity from the external environment.

In this case, the ground electrode 408 may be formed by including at least one of Mo, Al, W, Ti, Cu, ITO, IZO, and IXO.

Figure 25:
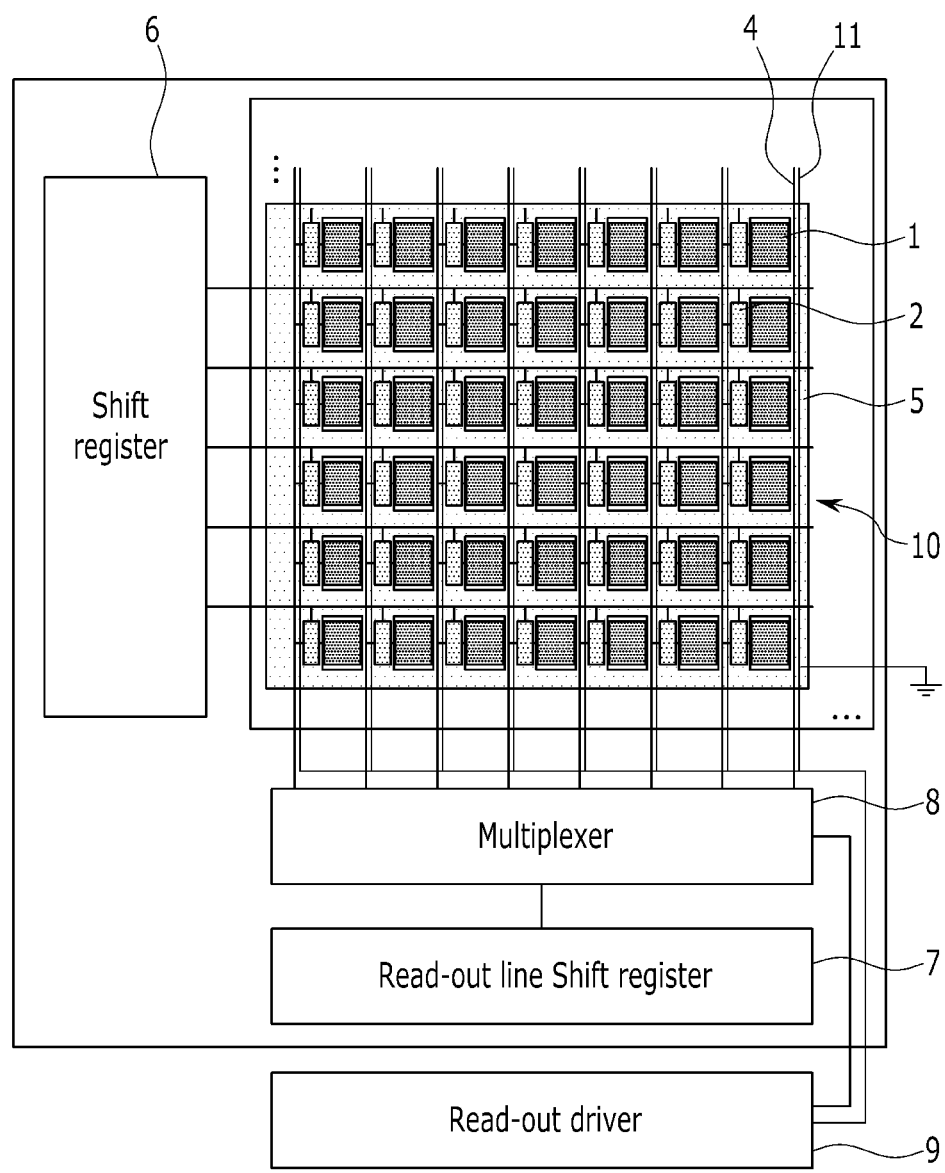
FIG. 25 is a schematic diagram of a capacitive fingerprint sensing device according to an exemplary embodiment of the present invention.

FIG. 25 is a schematic diagram of a capacitive fingerprint sensing device according to an exemplary embodiment of the present invention.

Referring to FIG. 25, a capacitive sensor includes a pixel portion 10 including pixel electrodes 1, pixel driving circuits 2, coupling pulse lines 11, and ground lines 5, a plurality of readout lines 4, a multiplexer 8 controlling the ground lines 5, a readout line shift register 7 controlling the multiplexer 8, and a readout driver 9 reading a signal controlled from the multiplexer 8.

The pixel portion 10 transmits a signal that is changed depending on contact of a fingerprint to a readout circuit through the readout line 4, and the readout circuit reads a current difference.

As shown in FIG. 25, a shift register 6 may be embedded on a substrate together with the pixel portion 10, the multiplexer 8, and the readout line shift register 7, or may be provided using an external scan line shift register IC rather than being embedded in a sensor.

Figure 26:
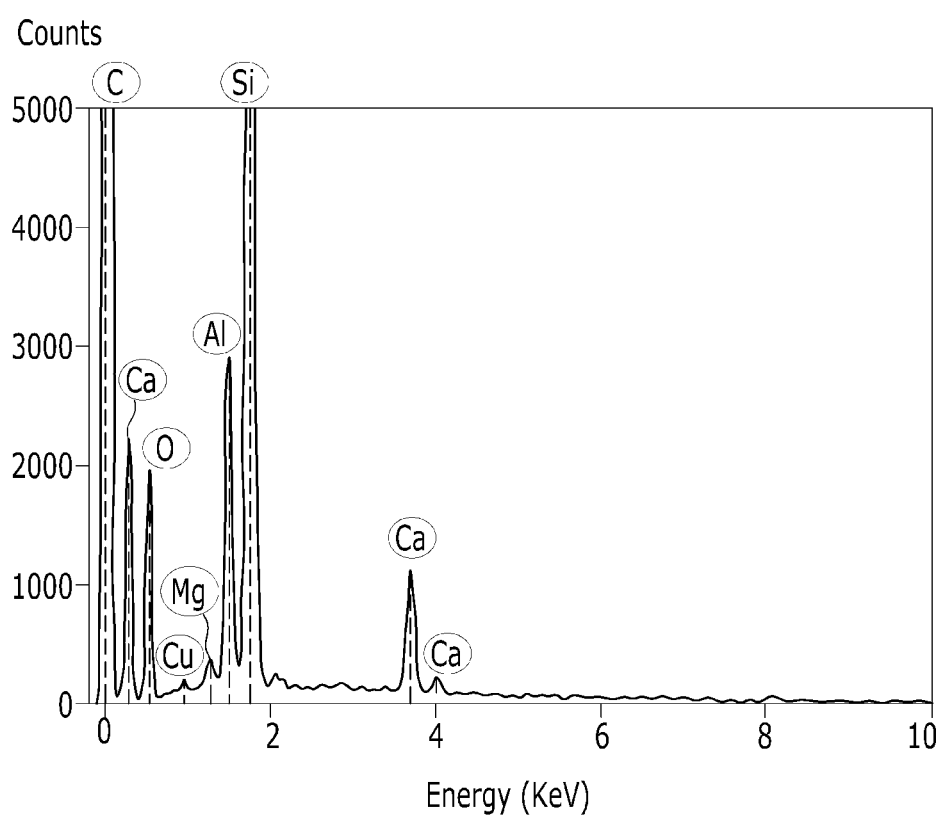
FIG. 26 and FIG. 27 are graphs provided for description of a passivation layer of a capacitive fingerprint sensor according to an exemplary embodiment of the present invention.
Figure 27:
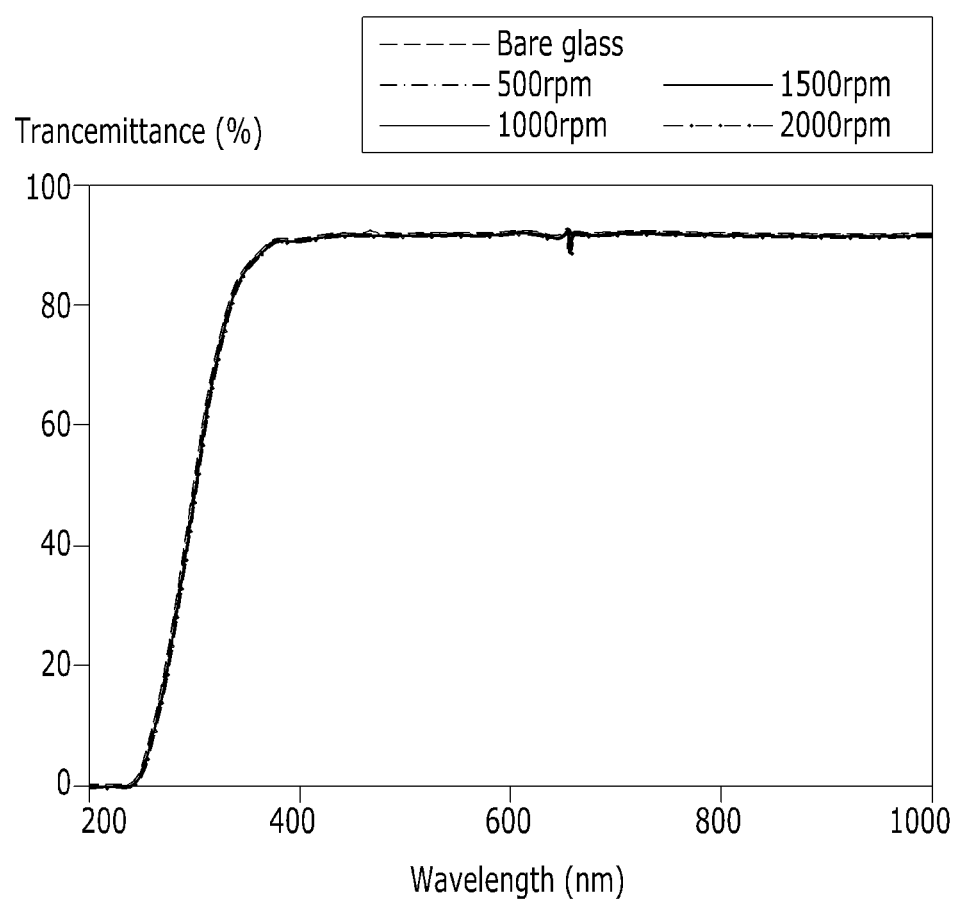

FIG. 26 and FIG. 27 are graphs provided for description of a passivation layer of a capacitive fingerprint sensor according to an exemplary embodiment of the present invention.

A first passivation layer 407 and a second passivation layer 409 according to the exemplary embodiment of the present invention may be formed of a flat layer material or a non-flat layer material, and the flat layer and the non-flat layer may be made of an organic material or an inorganic material, or a composite material of the organic material and the inorganic material.

More specifically, FIG. 26 and FIG. 27 are graphs of the case that the passivation layers are made of a planarizing material, and the graph of FIG. 26 is acquired through energy dispersive X-ray (EDX) analysis.

The EDX analysis is performed through a fluorescent X-ray device, and analyzes energy (wavelength) and strength of fluorescent X-rays generated by irradiating X-rays to a sample and examines a type and a content of an element forming the sample.

As shown in FIG. 26, the passivation layer according to the exemplary embodiment of the present invention may be formed by including at least one of Si, O, Al, Ca, Mo, Cu, and C.

The planarizing material forming the passivation layer according to the exemplary embodiment of the present invention is formed of a Si—O—Si inorganic material and an organic hybrid silicon polymer to block moisture and oxygen, and as shown in FIG. 27, the planarizing material has transmittance of 80% or more and thus it is advantageous for manufacture of a transparent sensor.

Figure 28:
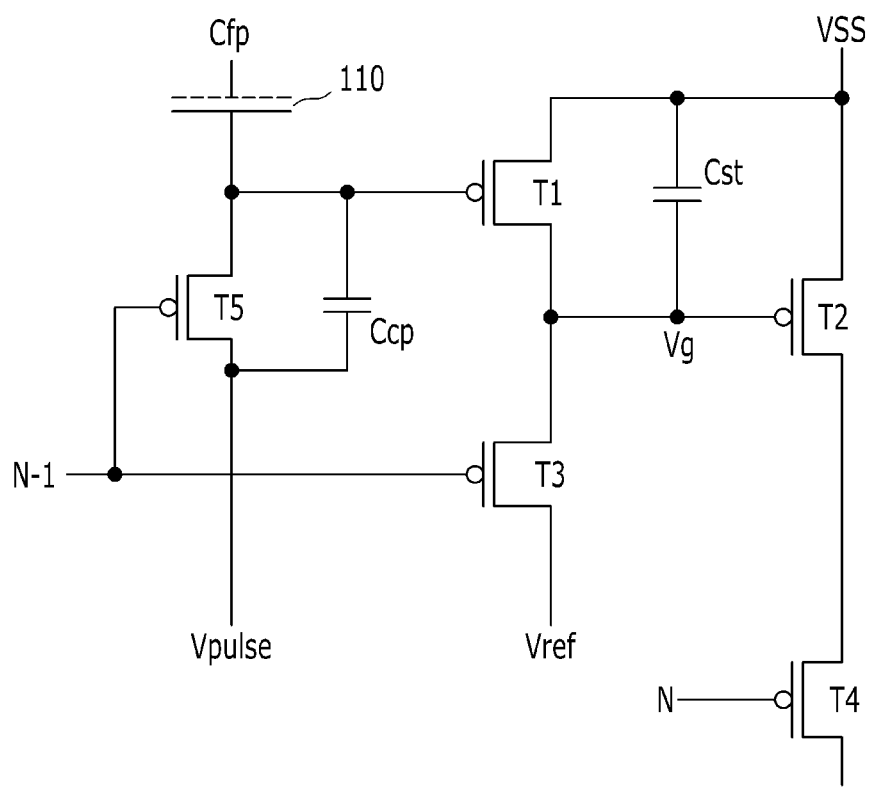
FIG. 28 is a circuit diagram of a capacitive fingerprint sensor according to another exemplary embodiment of the present invention.
Figure 29:
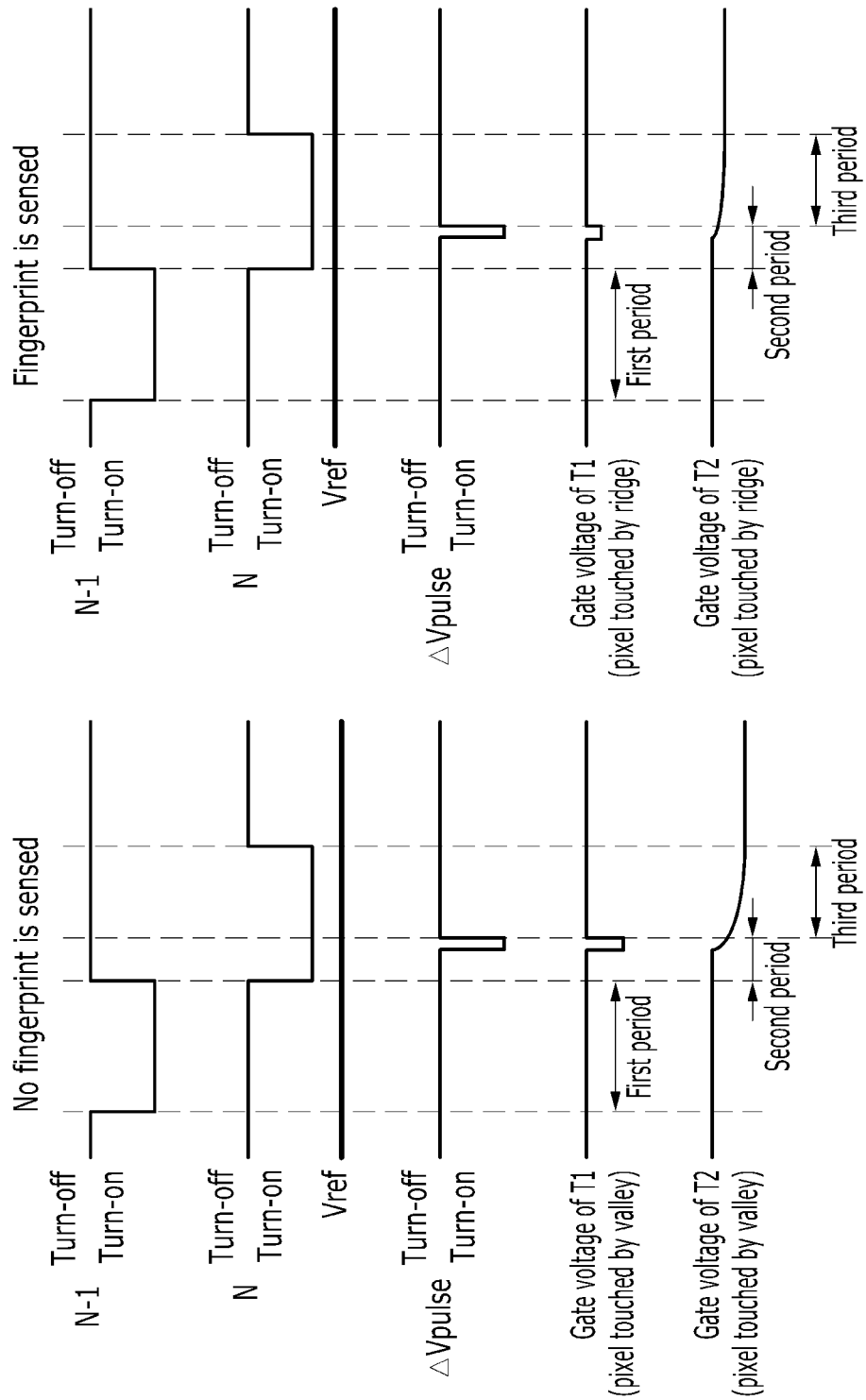
FIG. 29 is a timing diagram for driving of the capacitive fingerprint sensor according to other exemplary embodiment of the present invention.

FIG. 28 is a circuit diagram of a capacitive fingerprint sensor according to another exemplary embodiment of the present invention, and FIG. 29 is a timing diagram for driving of the capacitive fingerprint sensor according to the other exemplary embodiment of the present invention.

Referring to FIG. 28 and FIG. 29, a capacitive fingerprint sensor according to another exemplary embodiment of the present invention will be described.

A scan line pulse having a high voltage and a low voltage repeated at regular intervals is applied in N−1 of FIG. 28, and when a voltage of the scan line pulse is a high voltage, a third transistor T3 and a fifth transistor T5 are turned on.

In this case, the gate electrode of the first transistor T1 is setup with a high voltage of the coupling pulse ΔVpulse having a clock signal in which a high voltage and a low voltage are repeated at regular intervals, and a gate electrode of the second transistor T2 may be setup with a low voltage or a high voltage by a signal Vref. Next, an (N−1)-th scan line pulse becomes a high voltage and thus turns off the third transistor T3 and the fifth transistor T5.

An N-th scan line pulse is then applied, and a voltage of the scan line pulse becomes a low voltage and thus the fourth transistor T4 is turned on.

Subsequently, when a voltage of the coupling pulse ΔVpulse is applied as a low voltage from a high voltage, the gate node of the first transistor T1 that is floated due to the fifth transistor T5 in the turned-off state is decreased to a low voltage due to capacitive coupling.

In the above-detailed description of the present invention, specific examples have been described. However, various modifications are possible without departing from the scope of the present invention. The technical idea of the present invention should not be limited to the above-described embodiments of the present invention but should be determined by the claims and equivalents thereof.

DESCRIPTION OF SYMBOLS

T1: first transistor
T2: second transistor
T3: third transistor
T4: fourth transistor
T5: fifth transistor
401: substrate
402: active layer
403: gate insulation layer
404: gate electrode
405: intermediate insulation layer
406: data electrode
407: first passivation layer
408: ground electrode
409: second passivation layer
410: via hole
420: fingerprint sensor electrode
430: fingerprint
431: ridge
432: valley

What is claimed is:

1. A capacitive fingerprint sensor comprising:
a fingerprint sensor electrode for sensing a fingerprint of a human body;
a first transistor of which a current or an output voltage is changed according to a voltage change of capacitive coupling formed by fingerprint capacitance formed when a fingerprint contacts the fingerprint sensor electrode and coupling capacitor for capacitive coupling;
a fifth transistor that resets a gate electrode of the first transistor and applies capacitive coupling to the gate electrode of the first transistor through a coupling pulse;
a second transistor of which a current or an output voltage is changed due to a difference in the current flowing through the first transistor and a gate voltage is maintained by a capacitor;
a third transistor that resets a gate electrode of the second transistor; and
a fourth transistor that controls a current flowing through the second transistor or an output voltage of the second transistor and transmits the controlled current or output voltage to a readout circuit.

2. The capacitive fingerprint sensor of claim 1, wherein the coupling pulse is formed of a clock signal having a high voltage and a low voltage that are repeated, and the clock signal is continuously applied during one frame.

3. The capacitive fingerprint sensor of claim 1, wherein the coupling pulse is changed to a low voltage once when a scan signal is applied to the corresponding pixel while maintaining a high voltage for one frame, or is changed to a high voltage once when the scan signal is applied to the corresponding pixel while maintaining a low voltage for one frame.

4. The capacitive fingerprint sensor of claim 1, wherein the gate electrode of the first transistor is reset by the high voltage or the low voltage of the coupling pulse.

5. The capacitive fingerprint sensor of claim 1, wherein the gate electrode of the second transistor is reset by the high voltage or the low voltage of the coupling pulse.

6. The capacitive fingerprint sensor of claim 1, wherein the fingerprint capacitance is formed by an active layer, which is a fingerprint sensor electrode, a gate insulation layer, an intermediate insulation layer, a first passivation layer, a second passivation layer, and a fingerprint, and the fingerprint capacitance is changed according to height differences of ridges and valleys of the fingerprint.

7. The capacitive fingerprint sensor of claim 6, wherein the coupling capacitance is formed by the active layer, the gate insulation layer, the intermediate insulation layer, and the data electrode, or is formed by lateral capacitance between active layers.

8. The capacitive fingerprint sensor of claim 6, wherein the first passivation layer and the second passivation layer are formed of a flat layer material or a non-flat layer material.

9. The capacitive fingerprint sensor of claim 8, wherein the flat layer material is formed of a Si—O—Si inorganic material and an organic hybrid silicon polymer.

10. The capacitive fingerprint sensor of claim 8, wherein the flat layer material and the non-flat layer material are formed of an organic material or an inorganic material, or a composite material of the organic material and the inorganic material.

11. The capacitive fingerprint sensor of claim 6, wherein the first passivation layer is formed of a photosensitive polyimide, and the second passivation layer is formed of a Si—O—Si inorganic material and an organic hybrid silicon polymer.

12. The capacitive fingerprint sensor of claim 6, wherein the first passivation layer and the second passivation layer comprise at least one of Si, O, Al, Ca, Mo, Cu, and C.

13. The capacitive fingerprint sensor of claim 6, wherein the first passivation layer and the second passivation layer are formed of a photosensitive polyimide.

14. The capacitive fingerprint sensor of claim 6, wherein the first passivation layer and the second passivation layer comprise an imide.

15. The capacitive fingerprint sensor of claim 1, wherein the fingerprint capacitance is formed by a gate electrode, which is a fingerprint sensor electrode, an intermediate insulation layer, a first passivation layer, a second passivation layer, and a fingerprint, and is changed according to height differences of ridges and valleys of the fingerprint.

16. The capacitive fingerprint sensor of claim 15, wherein the coupling capacitance is formed by the gate electrode, the intermediate insulation layer, and the data electrode, or is formed of lateral capacitance between gate electrodes.

17. The capacitive fingerprint sensor of claim 1, wherein the fingerprint capacitance is formed of a fingerprint, a data electrode, which is a fingerprint sensor electrode, a first passivation layer, a second passivation layer, and a fingerprint, and is changed according to height differences of ridges and valleys.

18. The capacitive fingerprint sensor of claim 17, wherein the coupling capacitance is formed by a gate electrode, an intermediate insulation layer, and the data electrode, is formed by an active layer, a gate insulation layer, the intermediate insulation layer, and the data electrode, or is formed by lateral capacitance between data electrodes.

19. The capacitive fingerprint sensor of claim 1, wherein the fingerprint capacitance is formed by a ground electrode, which is the fingerprint sensor electrode, a second passivation layer, and a fingerprint, and is changed according to height differences of ridges and valleys.

20. The capacitive fingerprint sensor of claim 19, wherein the coupling capacitance is formed by a gate electrode, an intermediate insulation layer, and a data electrode, is formed by an active layer, a gate insulation layer, the intermediate insulation layer, and the data electrode, or is formed by lateral capacitance between data electrodes.

21. The capacitive fingerprint sensor of claim 1, wherein the capacitive fingerprint sensor controls the amount of current flowing through the first transistor and the amount of current flowing through the second transistor by adjusting a voltage level of the coupling pulse.

22. The capacitive fingerprint sensor of claim 1, comprising at least one of an n-type transistor and a p-type transistor.

23. The capacitive fingerprint sensor of claim 1, wherein a shift resistor is embedded or separately provided in the capacitive fingerprint sensor.

24. The capacitive fingerprint sensor of claim 1, wherein one of the first, second, third, fourth, and fifth transistors has one of a coplanar structure, an inverted staggered structure, and a staggered structure.

* * * * *